(12) United States Patent
Kim et al.

(10) Patent No.: US 11,277,887 B2
(45) Date of Patent: Mar. 15, 2022

(54) INDUCTION HEATING DEVICE HAVING IMPROVED COOLING STRUCTURE

(71) Applicant: LG Electronics Inc., Seoul (KR)

(72) Inventors: Seongjun Kim, Seoul (KR); Jaekyung Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 508 days.

(21) Appl. No.: 16/182,783

(22) Filed: Nov. 7, 2018

(65) Prior Publication Data

US 2019/0297687 A1  Sep. 26, 2019

(30) Foreign Application Priority Data

Mar. 23, 2018  (KR) .................... 10-2018-0034066

(51) Int. Cl.
*H05B 6/42* (2006.01)
*H05B 6/12* (2006.01)
*H05B 6/36* (2006.01)

(52) U.S. Cl.
CPC ......... *H05B 6/1263* (2013.01); *H05B 6/1218* (2013.01); *H05B 6/365* (2013.01); *H05B 2206/022* (2013.01); *H05B 2213/03* (2013.01)

(58) Field of Classification Search
CPC .... H05B 6/062; H05B 6/1209; H05B 6/1218; H05B 6/1254; H05B 6/1263; H05B 6/1272; H05B 6/1281; H05B 6/36; H05B 6/365; H05B 2206/022; H05B 2213/03; H05B 2213/05; H05B 2213/07; Y02B 40/00; Y02B 40/123; Y02B 40/126
USPC ....... 219/506, 586, 620, 622–624, 650, 662, 219/663, 664, 665, 671, 672, 675, 677; 362/92, 93, 551, 555, 559, 560
See application file for complete search history.

(56) References Cited

U.S. PATENT DOCUMENTS

| | | | |
|---|---|---|---|
| 10,088,145 B2 * | 10/2018 | Holzinger | H05B 6/1209 |
| 2003/0164370 A1 * | 9/2003 | Aihara | H05B 6/1263 219/622 |
| 2018/0213613 A1 * | 7/2018 | Matulla | H05B 6/1272 |

FOREIGN PATENT DOCUMENTS

| | | |
|---|---|---|
| EP | 0056974 | 8/1982 |
| EP | 1250028 | 10/2002 |
| JP | H01189888 | 7/1989 |
| JP | 2014044809 | 3/2014 |
| KR | 1020060033162 | 4/2006 |

(Continued)

OTHER PUBLICATIONS

Extended European Search Report in European Application No. 18202192.3, dated Jun. 3, 2019, 9 pages.

*Primary Examiner* — Hung D Nguyen
(74) *Attorney, Agent, or Firm* — Fish & Richardson P.C.

(57) ABSTRACT

An induction heating device includes: a casing; a cover plate coupled to a top of the casing and configured to seat an object on a top surface of the cover plate; a working coil located within the casing and configured to heat the object on the top surface of the cover plate; a base plate configured to support the working coil; an indicator board that is located vertically below the base plate and that is spaced apart from the base plate to define an air-flow path between the base plate and the indicator board, where the indicator board includes a plurality of light emitting elements; and a blowing fan located at a first side of a bottom surface of the casing and configured to suction air into the casing from an outside of the casing and to discharge air into the air-flow path.

20 Claims, 13 Drawing Sheets

(56) References Cited

FOREIGN PATENT DOCUMENTS

KR   1020180026141      3/2018
WO   WO2012137517      10/2012

* cited by examiner

INDUCTION HEATING DEVICE HAVING IMPROVED COOLING STRUCTURE

CROSS-REFERENCE TO RELATED APPLICATIONS

This application claims the priority of Korean Patent Application No. 10-2018-0034066, filed on Mar. 23, 2018, in the Korean Intellectual Property Office, the disclosure of which is hereby incorporated by reference in its entirety.

FIELD

The present disclosure relates to an induction heating device having an improved cooling structure.

BACKGROUND

Cooking devices may use various heating methods to heat food. For example, gas ranges use gas as fuel. In some examples, cooking devices may heat a loaded object such as a cooking vessel or a pot using electricity.

Various methods of heating a loaded object using electricity may be divided into a resistive heating type and an inductive heating type. In the electrical resistive heating method, heat may be generated based on current flowing through a metal resistance wire or a non-metallic heating element such as silicon carbide. In this method, heat may be transmitted to the loaded object through radiation or conduction to heat the loaded object. In the inductive heating method, an eddy current may be generated in the loaded object made of metal based on a high-frequency power of a predetermined magnitude applied to a working coil. In this method, the loaded object may be heated by the eddy current generated based on magnetic field around the working coil.

For example, the induction heating method may be performed as follows. When power is applied to the induction heating device, a high-frequency voltage of a predetermined magnitude is applied to the working coil. As a result, an inductive magnetic field is generated around the working coil disposed in the induction heating device. When the flux of the inductive magnetic field passes through a bottom of the loaded object containing the metal loaded on the induction heating device, an eddy current is generated inside of the bottom of the loaded object. When the resulting eddy current flows in the bottom of the loaded object, the loaded object itself is heated.

The induction heating device has each working coil in each corresponding heating region to heat each of a plurality of loaded-objects (e.g., a cooking vessel).

In some cases, an induction heating device may include a plurality of working coils, each working coil corresponding to a heating region to heat one of a plurality of loaded-objects (e.g., a cooking vessel).

In some cases, an induction heating device may heat a single object using a plurality of working coils simultaneously. This device may be referred to as a zone-free based induction heating device.

In some cases, a zone-free based induction heating device may heat the loaded-object inductively in a heating zone corresponding to a plurality of working coils, regardless of a size and loaded position of the loaded-object.

In some examples, the zone-free based induction heating device, or other types of induction heating devices such as a flex or dual-based induction heating device may include a cooling structure (e.g., a blowing fan) to control a temperature of components associated with driving of the working coil. Referring to FIG. 1 and FIG. 2, the cooling structure of an induction heating device is described.

FIG. 1 and FIG. 2 are schematic diagrams illustrating an example cooling structure in related art.

As illustrated in FIG. 1, an induction heating device may include a blowing fan 20 and a fan cover 50 disposed in the casing 10 to lower a temperature of a printed circuit board (PCB) 30 which controls the working coil or indicator that may include a light emitting element and a light guide.

In some cases, an air-flow path is defined in a bottom of the fan cover 50 to extend across a heat sink 40 attached to the PCB 30. Further, an air-discharge slit 15 is defined in one side portion of the casing 10 located opposite to the blowing fan 20 with the fan cover 50 being disposed between the air-discharge slit 15 and the blowing fan 20.

The air discharged from the blowing fan 20 may lower the temperature of the PCB 30 while passing through the air-flow path. Air passing through the air-flow path is discharged through the air-discharge slit 15 to the outside of the casing 10.

In some cases with the above cooling structure, heat generation from the working coil (that is, heat generation from the working coil due to an operation of the working coil), and heat generation from the indicator (that is, heat received from the working coil and heat generated from a light emitting element itself) may be not removed. In some cases, the indicator may be damaged due to the heat generated from the working coil.

In some examples, as illustrated in FIG. 2, an induction heating device may include the working coil 60 and the indicator 70 spaced apart from each other by a predetermined distance or larger (for example, 20 mm or larger) in order to remove the heat generated from the working coil 60 and the indicator 70. In this case, heat generated from working coil 60 and indicator 70 may be dissipated via radiation and convection.

In some cases when a product (i.e., an induction heating device) has a small size or when working coils with a high output are densely arranged (for example, in the zone-free based induction heating device), the spacing between the working coil 60 and the indicator 70 is further reduced. In these cases, heat generated from working coil 60 and indicator 70 may not be removed.

SUMMARY

One purpose of the present disclosure is to provide an induction heating device capable of controlling temperatures of a working coil and an indicator.

Another purpose of the present disclosure is to provide an induction heating device that minimizes an indicator damage due to heat generation from the working coil.

The purposes of the present disclosure are not limited to the above-mentioned purposes. Other purposes and advantages of the present disclosure, as not mentioned above, may be understood from the following descriptions and more clearly understood from the implementations of the present disclosure. Further, it will be readily appreciated that the objects and advantages of the present disclosure may be realized by features and combinations thereof as disclosed in the claims.

According to one aspect of the subject matter described in this application, an induction heating device includes: a casing; a cover plate coupled to a top of the casing and configured to seat an object on a top surface of the cover plate; a working coil located within the casing and configured to heat the object on the top surface of the cover plate;

a base plate configured to support the working coil; an indicator board that is located vertically below the base plate and that is spaced apart from the base plate to define an air-flow path between the base plate and the indicator board, where the indicator board includes a plurality of light emitting elements; and a blowing fan located at a first side of a bottom surface of the casing and configured to suction air into the casing from an outside of the casing and to discharge air into the air-flow path.

Implementations according to this aspect may include one or more of the following features. For example, the casing may define an air-discharge slit at a second side of the bottom surface of the casing opposite to the first side, the air-discharge slit being configured to discharge air from the air-flow path to the outside of the casing. In some examples, the base plate and the indicator board are located at a middle region of the casing between the first side and the second side. The blowing fan may be located outside of the middle region at the first side of the bottom surface of the casing, and the air-discharge slit may be defined outside of the middle region at the second side of the bottom surface of the casing.

In some implementations, the induction heating device may further include an indicator board support that seats the indicator board, where the air-flow path is defined by a bottom surface of the base plate, a top surface of the indicator board, and a lateral surface of the indicator board support. In some implementations, the base plate is a single plate made of aluminum (Al). In some implementations, the blowing fan is configured to, based on discharging air to the air-flow path, decrease a temperature of the working coil and a temperature of the plurality of light emitting elements.

In some implementations, the induction heating device may further include: a light guide that is located at the base plate and that surrounds at least a portion of the working coil, where the light guide has a light-emission face configured to indicate whether the working coil is driven and to indicate an intensity of the working coil; a ferrite core located at the base plate vertically below the working coil, the ferrite core being configured to diffuse a magnetic field generated by the working coil; a mica sheet located between the working coil and the ferrite core and configured to reduce heat transfer from the working coil to the ferrite core; and an indicator board support that seats the indicator board. In some examples, the mica sheet is configured to couple to the working coil and to the ferrite core by a sealant.

In some implementations, the plurality of light emitting elements are located vertically below the light guide and configured to emit light toward the light guide. The light guide may include: a light-guide portion that has an upper surface including the light-emission face and a lower surface having a parabolic shape, where the upper surface extends in a first direction by a first length and the lower surface extending in the first direction by a second length that is less than the first length; and a light-guide support that is located at the base plate, that surrounds at least a portion of the light-guide portion, and that is configured to reflect light emitted from the plurality of light emitting elements inwardly to the light-guide portion. The light-guide support allows propagation of light through the light-guide portion toward the light-emission face.

In some implementations, the lower surface of the light-guide portion includes: a first linear section that extends linearly from a first lateral end of the lower surface of the light-guide portion; a curved section that extends in the parabolic shape from the first linear section; and a second linear section that extends linearly from the curved section to a second lateral end of the lower surface of the light-guide portion, the second lateral end being opposite to the first lateral end. In some examples, the upper surface of the light-guide portion extends in a second direction by a third length, the second direction being orthogonal to the first direction, and the lower surface of the light-guide portion extends in the second direction by a fourth length that is less than the third length.

In some implementations, the lower surface of the light-guide portion is configured to refract and diffuse light emitted from the plurality of light emitting elements, and the light-emission face is configured to emit at least one of light reflected from the light-guide support inwardly toward the light-guide portion or light transmitted through the light-guide portion without reflection at the light-guide support. In some implementations, the plurality of light emitting elements are arranged at symmetric positions with respect to a center of the lower surface of the light-guide portion to allow a uniform distribution of light on the light-emission face.

In some implementations, the plurality of light emitting elements include: first and second light-emitting elements that are spaced apart from each other by a first distance and that are located at symmetric positions with respect to a center of the lower surface of the light-guide portion; third and fourth light-emitting elements that are spaced apart from each other by a second distance greater than the first distance and that are located at symmetric positions with respect to the center of the lower surface of the light-guide portion; and fifth and sixth light-emitting elements that are spaced apart from each other by a third distance greater than the second distance and that are located at symmetric positions with respect to the center of the lower surface of the light-guide portion.

In some implementations, the first distance between the first and second light-emitting elements is greater than a distance between the first and third light-emitting elements, and the distance between the first and third light-emitting elements is greater than a distance between the third and fifth light-emitting elements.

In some implementations, the light guide further includes a diffusion film located on the upper surface of the light-guide portion. In some implementations, a cross-sectional shape of the light-guide support is a trapezoidal shape. The light guide may include a plurality of light guides that each surround at least a portion of the working coil, where each light guide is inclined with respect to the base plate.

In some implementations, the plurality of light emitting elements are arranged at a surface of the indicator board that faces the air-flow path. The air-flow path may be located vertically above the blowing fan, and the blowing fan may be configured to generate flow of air in an upward direction to the air-flow path from the bottom surface of the casing.

Further specific effects of the present disclosure as well as the effects as described above will be described in conduction with illustrations of specific details for carrying out the invention.

BRIEF DESCRIPTION OF DRAWINGS

Throughout the drawings, like reference numerals refer to like elements.

DETAILED DESCRIPTION

Figure 1:
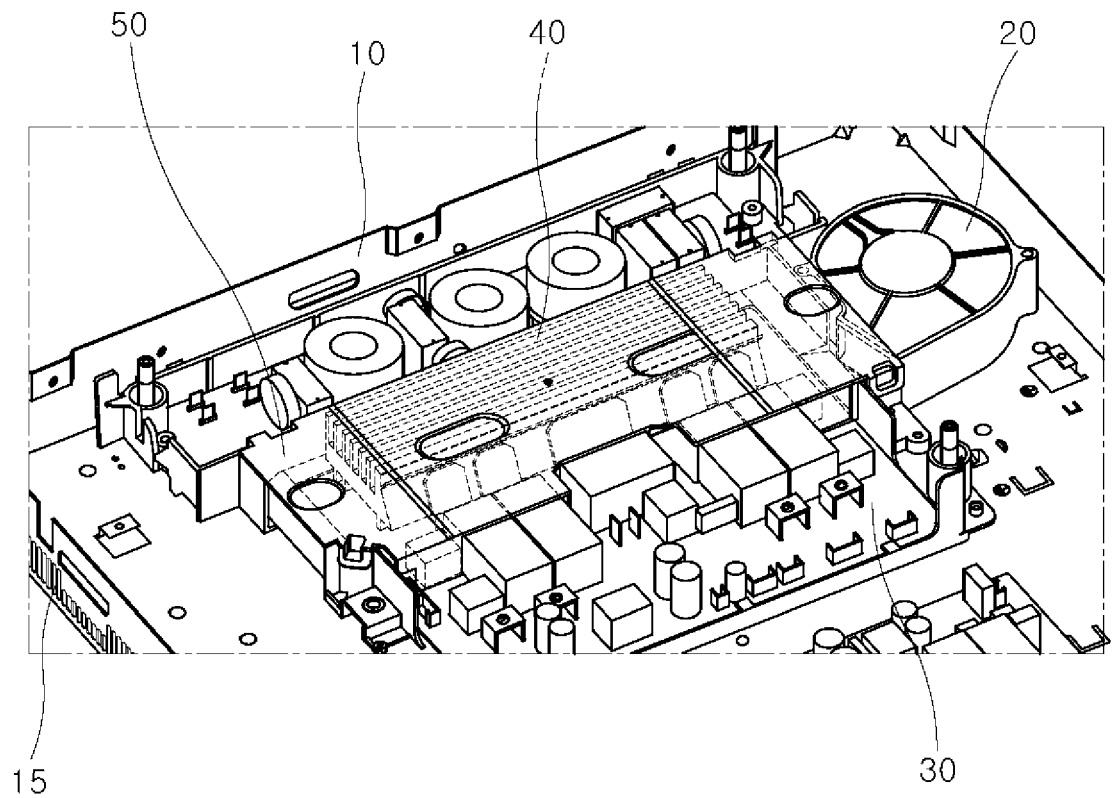
FIG. 1 and FIG. 2 are schematic diagrams illustrating an example cooling structure of an induction heating device in related art.
Figure 2:
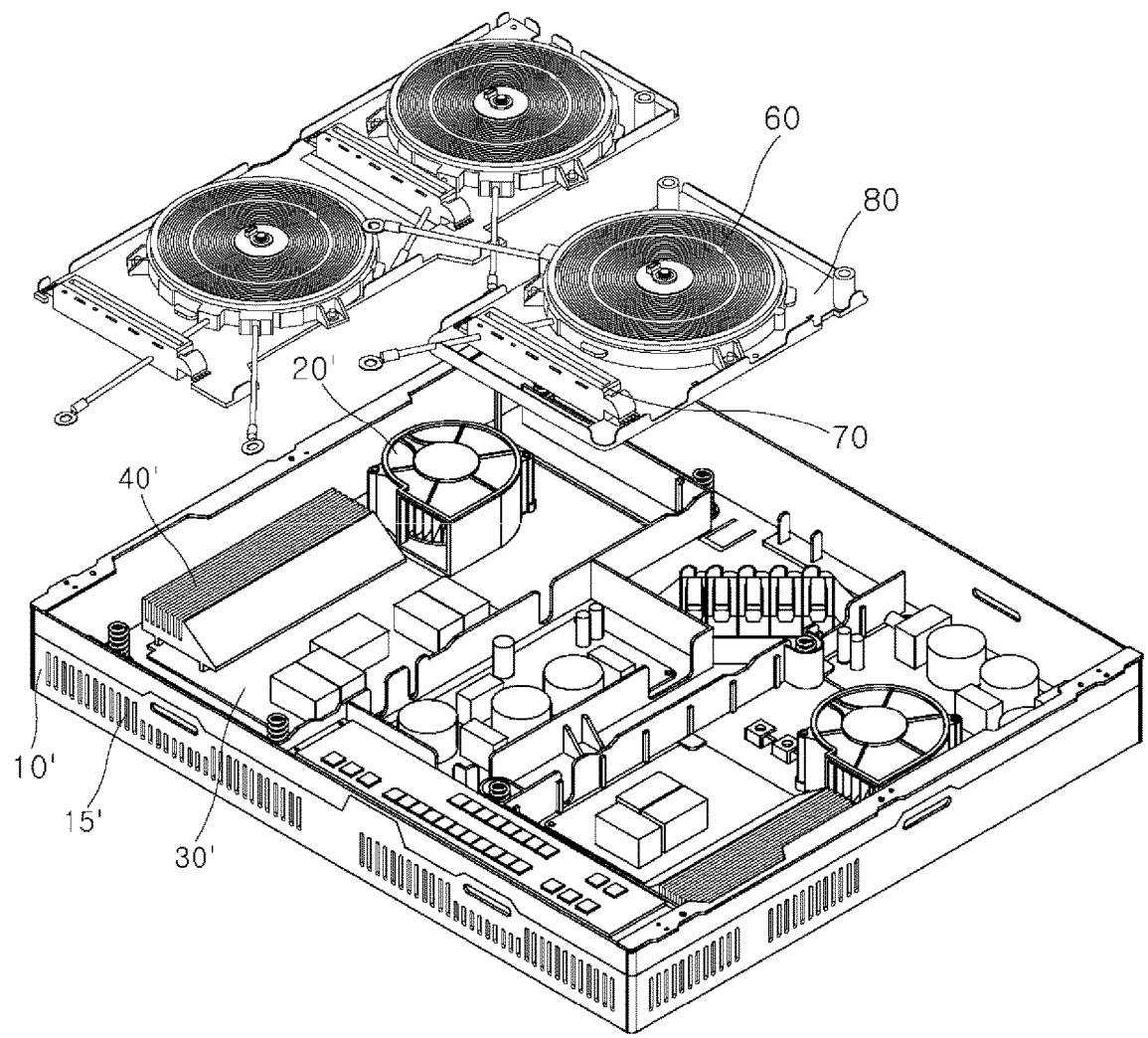
Figure 3:
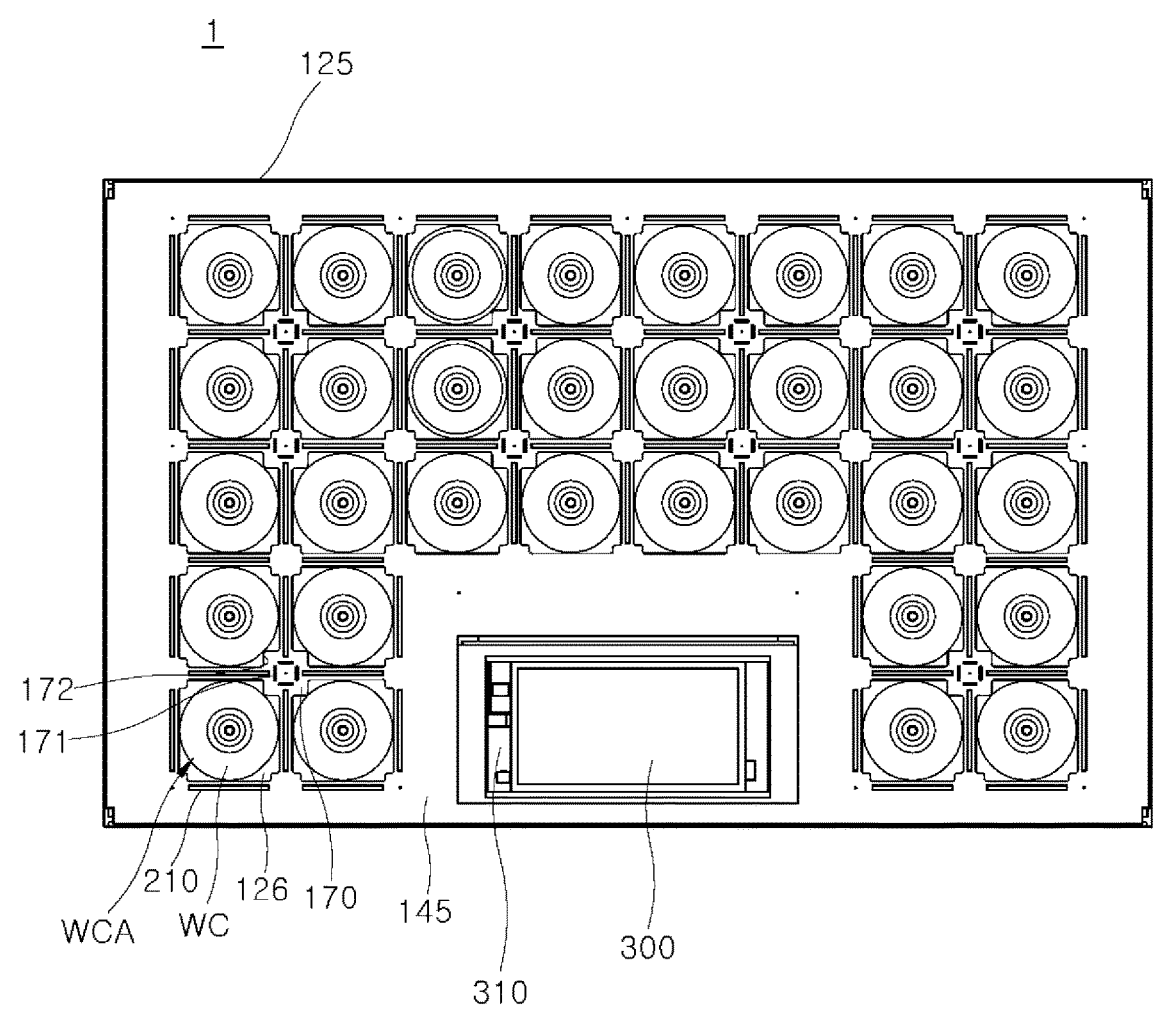
FIG. 3 is a top plan view of an example induction heating device according to the present disclosure.
Figure 4:
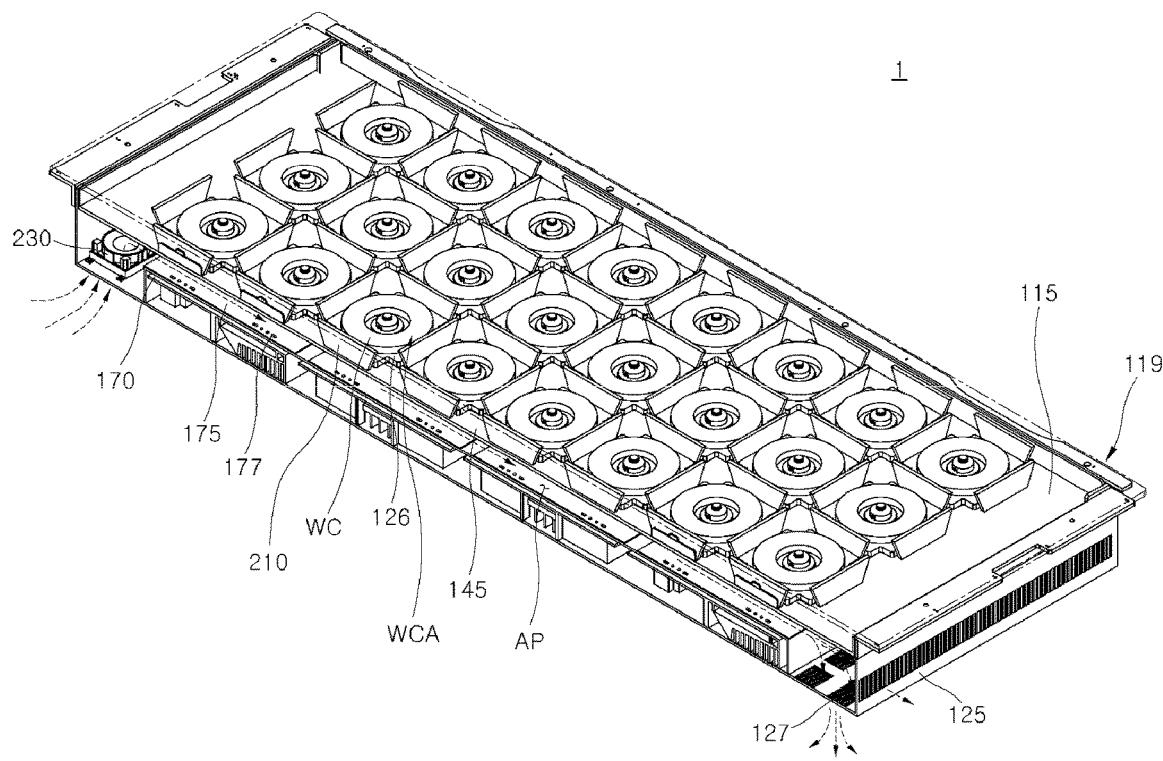
FIG. 4 is a partial perspective view illustrating the induction heating device of FIG. 3.
Figure 5:
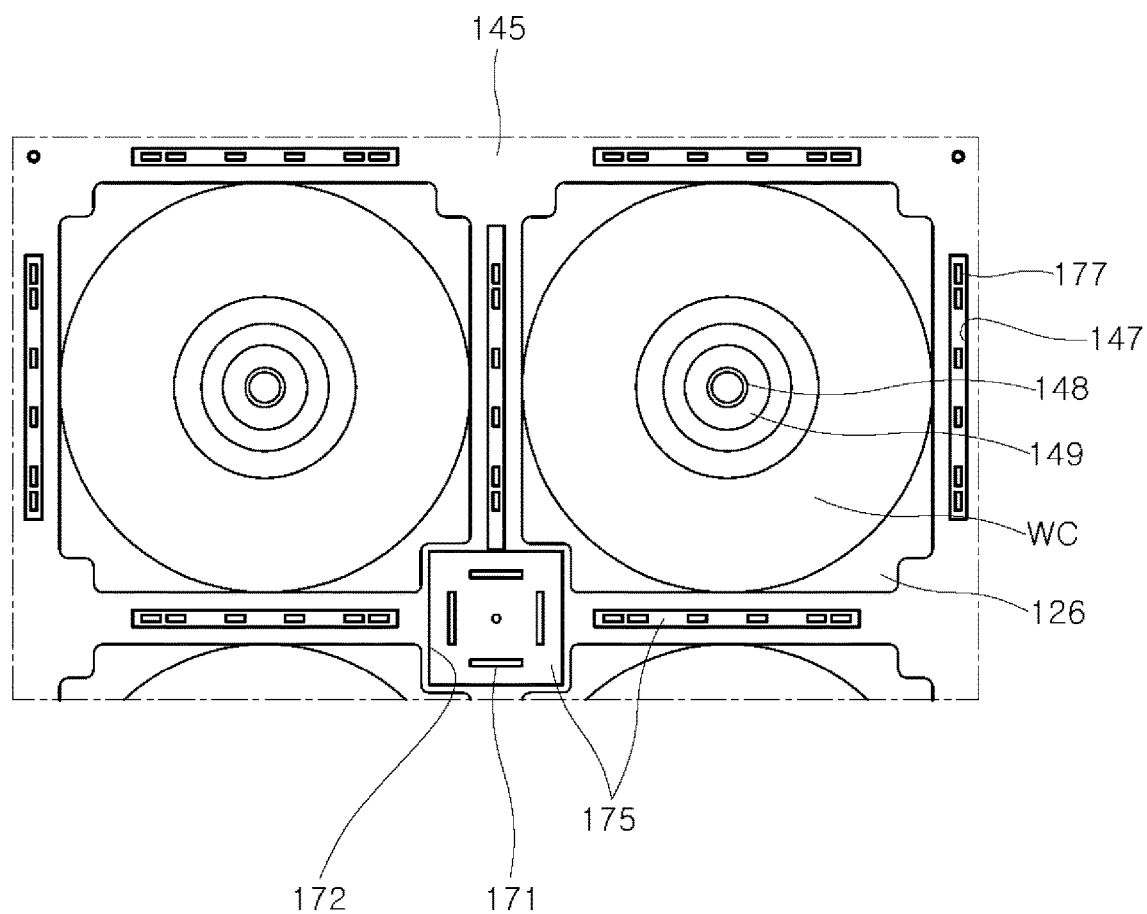
FIG. 5 and FIG. 6 are partial enlarged views of the induction heating device of FIG. 4.
Figure 6:
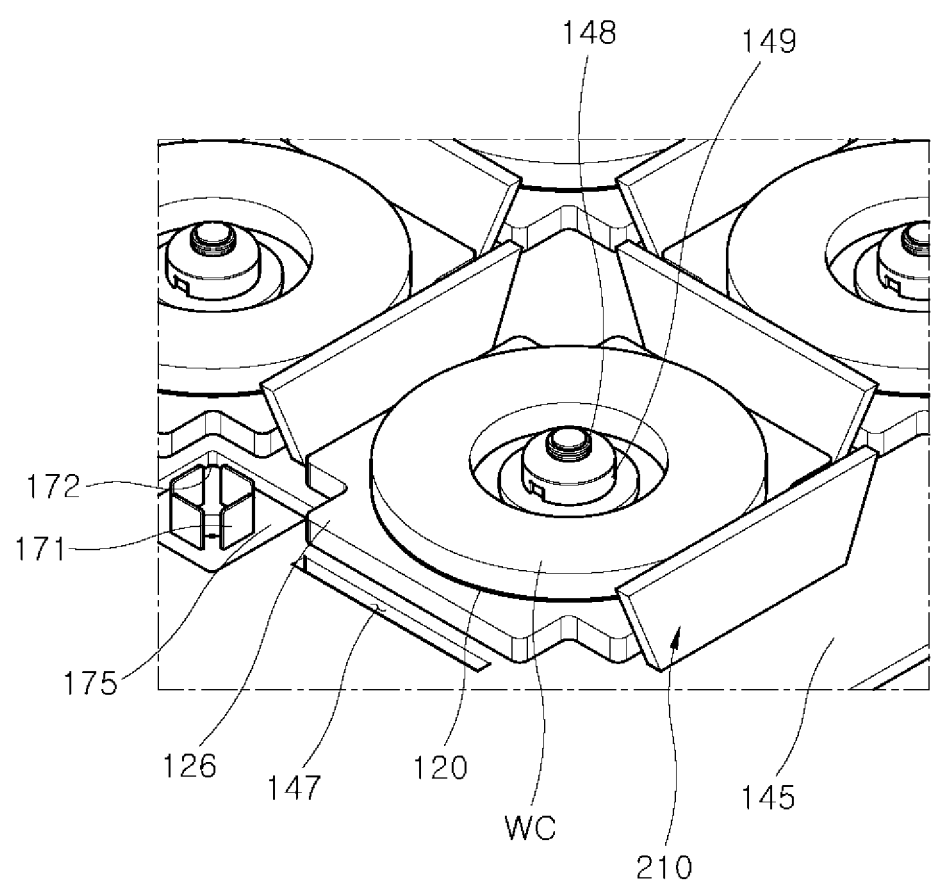
Figure 7:
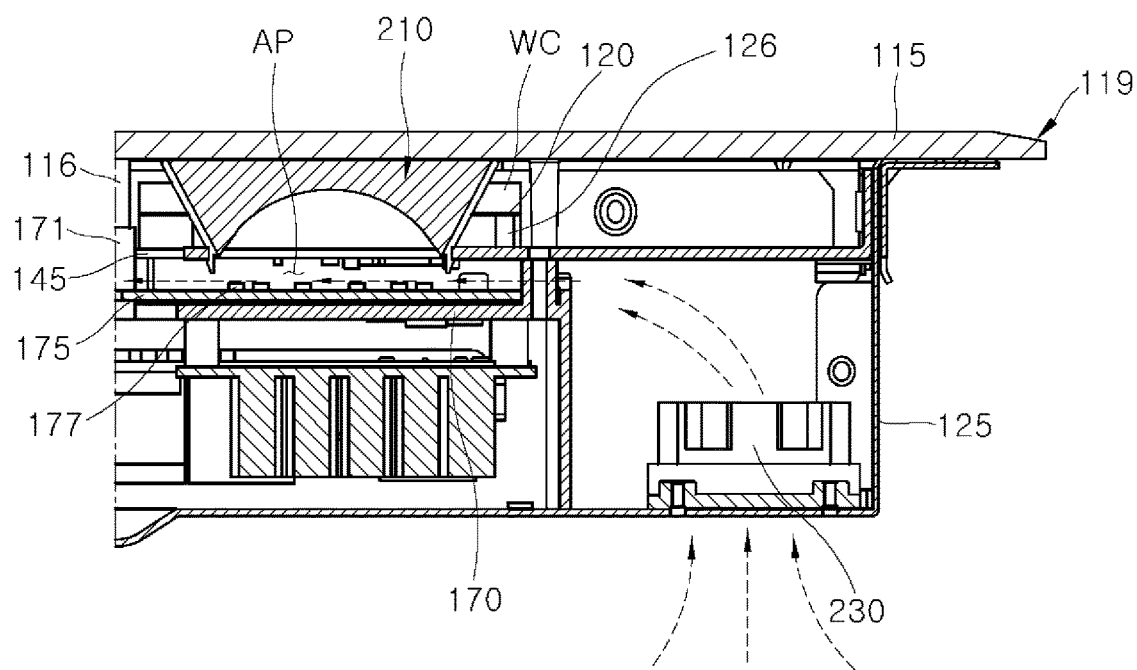
FIG. 7 is a partial cross-sectional view of the induction heating device of FIG. 4.
Figure 8:
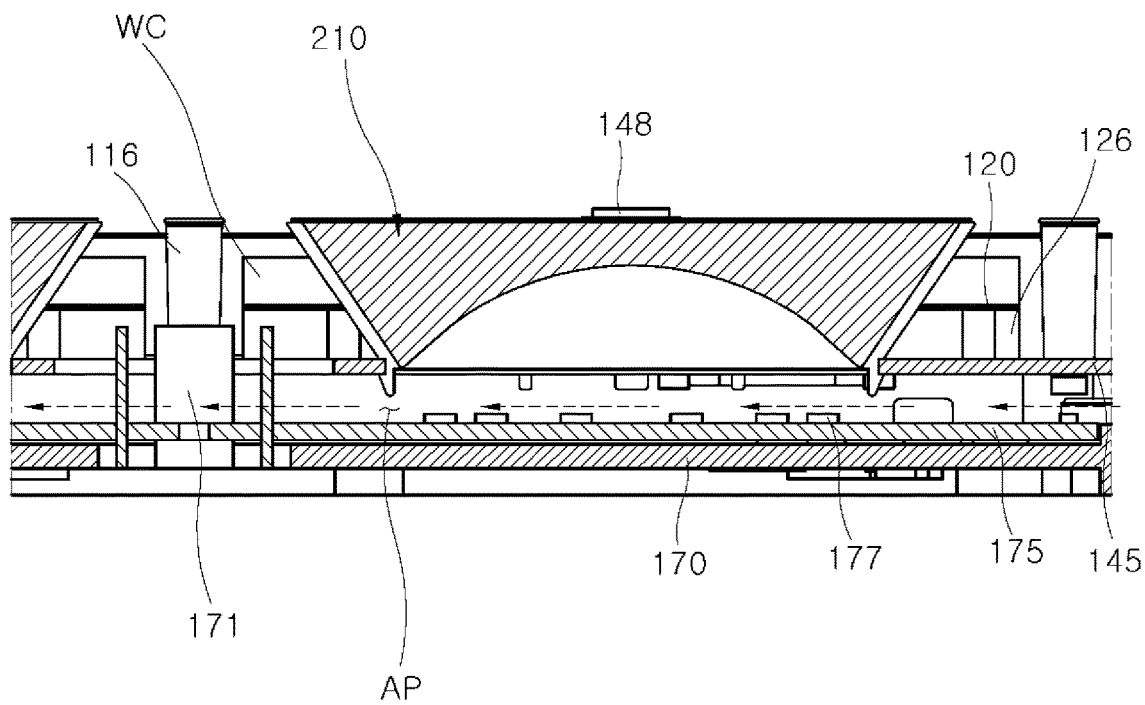
FIG. 8 is a partial enlarged view of FIG. 7.

Hereinafter, an inductive-heating device is illustrated. FIG. 3 is a top plan view of an example induction heating device according to one implementation of the present disclosure. FIG. 4 is a partial perspective view illustrating the induction heating device of FIG. 3. FIG. 5 and FIG. 6 are partial enlarged views of the induction heating device of FIG. 4. FIG. 7 is a partial cross-sectional view of the induction heating device of FIG. 4. FIG. 8 is a partial enlarged view of FIG. 7. FIG. 9 to FIG. 13 are schematic diagrams for illustrating an example light guide of FIG. 8.

In FIG. 4, some of the components (e.g., an input interface and some working coil assemblies, etc.) of the induction heating device 1 of FIG. 3 are omitted for convenience of illustration. In FIG. 6, for the convenience of illustration, some of the components (e.g., a light guide) of the induction heating device 1 of FIG. 4 are omitted.

Referring to FIG. 3 to FIG. 8, an induction heating device 1 may include a casing 125, a cover plate 119, a base plate 145, an indicator board support 170, an indicator board 175, a light emitting element 177, a light guide 210, a blowing fan 230, and a working coil assembly WCA.

Within the casing 125, there are disposed various components constituting the induction heating device 1 such as the working coil assembly WCA, the base plate 145, the indicator board support 170, the indicator board 175, the light emitting element 177, the light guide 210 and the blowing fan 230.

In some implementations, the casing 125 may accommodate various units associated with driving of the working coil WC. An example of the various units associated with driving of the working coil WC may include a power supply that provides AC power, a rectifier for rectifying the AC power of the power supply to DC power, an inverter for converting the DC power rectified by the rectifier to resonant current via switching operation and for supplying the current to the working coil WC, a control unit for controlling the inverter and components associated with the driving of the inverter, and a relay or semiconductor switch that turns the working coil WC on or off. Specific descriptions thereof will be omitted.

In some implementations, the casing 125 may be thermally insulated to prevent heat generated by the working coil WC from leaking to the outside.

In some implementations, at the other side of the bottom face of the casing 125, an air-discharge slit 127 may be formed. Air passing through the air-flow path AP as described later may be discharged outside the casing 125 through the air-discharge slit 127.

In another example, the air-discharge slit 127 may be formed not only at the other side of the bottom face of the casing 125, but also at a side location of the casing 125 located adjacent to said other side of the bottom face.

The cover plate 119 is coupled to an upper end of the casing 125 to seal the inside of the casing 125. A loaded-object to be heated may be disposed on a top face of the cover plate.

For example, the cover plate 119 may include a loading plate 115 for loading an object to be heated, such as a cooking vessel thereon. Heat generated from the working coil WC may be transferred to the object to be heated through the loading plate 115.

In this connection, the loading plate may be made of, for example, a glass material. The loading plate may include an input interface (300) that receives input from a user and transfers the input to a control unit for the input interface. The present disclosure is not limited thereto. That is, the input interface may be disposed at a position other than a position on the loading plate 115.

In some implementations, the input interface 300 may be a module for allowing a user to input a desired heating intensity, a driving time of the induction heating device 1, and the like. The input interface 300 may be implemented in a various manner including as a physical button or a touch panel. In some examples, the input interface 350 may include, for example, a power button, a lock button, a power level control button (+, -), a timer control button (+, -), and a charge mode button.

For reference, the input interface (300) may transfer the input provided from the user to the control unit (310) for the input interface which, in turn, may transmit the input to the control unit as described above (the control unit for the inverter). The details of this will be omitted.

In one example, the working coil assembly WCA may include a working coil WC, a ferrite core 126, and a mica sheet 120 (i.e., a first mica sheet).

In some implementations, when the induction heating device 1 is embodied as a zone-free based inductive-heating device, a plurality of working coil assembles WCAs may be present as shown in FIG. 3 and FIG. 4. The plurality of working coil assemblies may be spaced apart from each other by a predetermined distance.

For convenience of illustration, a single working coil assembly WCA is illustrated as an example.

For example, the working coil WC may include a conductive wire coiled multiple times in an annular shape, and may generate an AC magnetic field. Below the working coil WC, the mica sheet 120 and the ferrite core 126 may be arranged vertically in this order.

The ferrite core 126 is disposed below the working coil WC. A core hole may be defined in a central region of the ferrite core so as to overlap an annular inner face of the working coil WC in a vertical direction.

For example, the base plate 145 may be disposed below the ferrite core 126. The mica sheet 120 may be disposed between the ferrite core 126 and the working coil WC.

In some implementations, as illustrated in FIG. 5 and FIG. 6, a packing gasket 149 is fitted into the core hole. Thus, the ferrite core 126 may be fixed to the base plate 145. A sensor 148 may be disposed on a top face of the packing gasket 149. In some implementations, the sensor 148 senses a temperature of the loading plate 115, a temperature of the working coil WC, or an operation of the working coil WC. Then, the sensor 148 may transmit such sensed information to the control unit 310 for the input interface as described above.

In some implementations, the ferrite core 126 may be fixed to the mica sheet 120 using a sealant. The ferrite core may diffuse the AC magnetic field generated from the working coil WC.

The mica sheet 120 (i.e., the first mica sheet) may be disposed between the working coil WC and the ferrite core 126. A sheet hole may be defined in a central region of the mica sheet 120 so as to overlap the annular inner face of the working coil WC in the vertical direction Z.

In some implementations, although not illustrated in the figure, the induction heating device 1 may further include a second mica sheet. The second mica sheet may be fixed to a top face of the working coil WC via a sealant. A second sheet hole may be defined in a central region of the second mica sheet to overlap the annular inner face of the working coil WC in the vertical direction Z.

The working coil assembly WCA is disposed on the base plate 145.

For example, a vertical stack of the ferrite core 126, the mica sheet 120, and the working coil WC may be disposed on the base plate 145. The base plate 145 may be spaced upwardly (i.e., vertically) away from the indicator board support 170.

That is, the indicator board 175 may be disposed below the base plate 145 and may be spaced away from the base plate 145. Accordingly, an air-flow path AP may be defined between the base plate 145 and the indicator board support 170 (e.g., the indicator board 175). The details of the path AP will be described later.

In some implementations, as illustrated in FIG. 5 and FIG. 6, a connection hole 172 may be formed as a space between the base plate 145 and the ferrite core 126 to secure a space for a connection portion 171. In this connection, the connection portion 171 may be arranged to protrude from the indicator board 175 for positioning and electrical connection of the conductive wire of the working coil WC. That is, the conductive wire of the working coil disposed around the connection portion 171 may be connected to the connection portion 171.

In some implementations, the base plate 145 may be formed into a single body piece and may be made of, for example, aluminum Al. However, the present disclosure is not limited thereto.

In addition, a light guide 210 may be disposed on the base plate 145.

For example, on the base plate 145, light guides 210 may be arranged around the working coil WC. That is, for example, four light guides 210 per working coil WC may be arranged around the corresponding working coil WC.

In this connection, as illustrated in FIG. 5 and FIG. 6, a light guide receiving hole 147 for arrangement of the light guide 210 may be defined between the base plate and the ferrite core and in the base plate 145. That is, the light guide receiving hole 147 may be defined in the base plate 145 at a position corresponding to the position of the light guide 210. Thus, light guide receiving holes 147 may be defined to surround the working coil WC. For example, four light guide receiving holes 147 per working coil WC may be defined around the corresponding working coil WC.

The light guide receiving hole 147 may be formed so as not to overlap with the connection hole 172. The number of the light guide receiving holes 147 may be equal to the number of the light guides 210.

In some implementations, light emitted from the light emitting element 177 disposed on the indicator board 175 may be transmitted through the light guide receiving hole 147 to the light guide 210. Details of this configuration will be described later.

The indicator board 175 may be disposed below the base plate 145 and may be spaced apart from the base plate 145. A plurality of light emitting elements 177 may be disposed on the indicator board 175.

For example, the indicator board 175 may be disposed on an indicator board support 170 to be vertically and downwardly spaced from the base plate 145. On the indicator board 175, a plurality of light emitting elements 177 may be disposed. The plurality of light emitting elements 177 may be embodied as, for example, light emitting diodes (LEDs). In some implementations, the plurality of light emitting elements 177 may be disposed symmetrically with respect to a center of a bottom face of the light guide 210. Details of this configuration will be described later.

In some implementations, the indicator board 175 may be implemented, for example, in a form of a printed circuit board (PCB). Whether the working coil WC is driven and the heating intensity (i.e., heating power) thereof may be indicated using the plurality of light emitting elements 177. In some implementations, although not illustrated in the drawing, the indicator board 175 may further include various components for driving the plurality of light emitting elements 177.

The indicator board 175 may be disposed on the indicator board support 170.

For example, the indicator board support 170 may be disposed below the indicator board 175 to support the indicator board 175. When there are the plurality of working coil WCs.

The blowing fan 230 may be disposed at one side of the bottom face of the casing 125. The blowing fan 230 may suction air (for example, external cool air) outside the casing 125 and discharges the air to the air-flow path AP formed between the base plate 145 and the indicator board 175.

For example, as illustrated in FIG. 4, in a middle region of the casing 125, the base plate 145 and the indicator board 175 are disposed. The blowing fan 230 may be disposed at one side of the bottom face of the middle region while the air-discharge slit 127 may be defined in the other side of the bottom face of the middle region opposite to the blowing fan 230.

That is, the air-flow path AP formed between the base plate 145 and the indicator board 175 may be located in the middle region of the casing 125.

In some implementations, the base plate 145 may be formed into a single body piece. The air-flow path AP may be defined by a bottom face of the base plate 145, a top face of the indicator board 175, and a side face of the indicator board support 170. As illustrated in FIG. 4, FIG. 7, and FIG. 8, air flowing from the blowing fan 230 to the air-flow path AP may be discharged to the outside of the casing 125 through the air-discharge slit 127. The air blown from the blowing fan 230 may reduce the temperature of the working coil WC and the indicator (particularly, the plurality of light emitting elements 177), while traveling through the air-flow path AP.

In other words, the above-defined configuration may reduce the temperature of the working coil WC and the indicator (especially, the plurality of light emitting elements 177) by enabling cold air circulation through the air-flow path AP. In some examples, this may facilitate dissipation of heat from the working coil WC and the indicator (in particular, the multiple light emitting elements 177) via radiation and convection.

In some implementations, a plurality of air-discharge slits 127 may be defined in the other side of the bottom face of the middle region of the base plate. Correspondingly, the plurality of blowing fans 230 may be disposed at one side of the bottom face of the middle region. However, for convenience of illustration, in one implementation of the present disclosure, an example in which a single blowing fan 230 is disposed at one side of the bottom face of the middle region will be exemplified.

In some implementations, the light guides 210 may be disposed on the base plate 145 so as to surround the periphery of the working coil WC. Each of the light guides 210 may indicate whether the corresponding working coil WC is driven and the intensity of the output thereof via a light-emission face 214 thereof.

In some implementations, as described above, four light guides 210 per one working coil WC may be arranged around the corresponding working coil WC. Each light guide 210 may be inserted into the respective light guide receiving hole 147 formed in the base plate 145.

In addition, the light guide 210 serves to emit the light emitted from the light emitting element 177 through the light-emission top face 214. A configuration of the light guide 210 will be described later in more detail.

The induction heating device 1 may also have a wireless power transfer function, based on the configurations and features as described above.

That is, in recent years, a technology for supplying power wirelessly has been developed and applied to many electronic devices. An electronic device with the wireless power transmission technology may charge a battery by simply placing the battery on a charging pad without connecting the battery to a separate charging connector. An electronic device to which such a wireless power transmission is applied does not require a wire cord or a charger, so that portability thereof is improved and a size and weight of the electronic device are reduced compared to the prior art.

Such a wireless power transmission system may include an electromagnetic induction system using a coil, a resonance system using resonance, and a microwave radiation system that converts electrical energy into microwave and transmits the microwave. The electromagnetic induction system may execute wireless power transmission using an electromagnetic induction between a primary coil provided in a unit for transmitting wireless power (for example, a working coil) and a secondary coil included in a unit for receiving the wireless power.

The induction heating device 1 heats the loaded-object via electromagnetic induction. Thus, the operation principle of the induction heating device 1 may be substantially the same as that of the electromagnetic induction-based wireless power transmission system.

Therefore, the induction heating device 1 disclosure may have the wireless power transmission function as well as induction heating function. Furthermore, an induction heating mode or a wireless power transfer mode may be controlled by the control unit (or the control unit for the input interface). Thus, if desired, the induction heating function or the wireless power transfer function may be selectively used.

Thus, the induction heating device 1 has the configuration and features as described above. Hereinafter, the light guide 210 and the light emitting element 177 having the above-described configuration and features will be described more specifically.

FIG. 9 to FIG. 13 are schematic diagrams for illustrating the light guide of FIG. 8.

Figure 13:
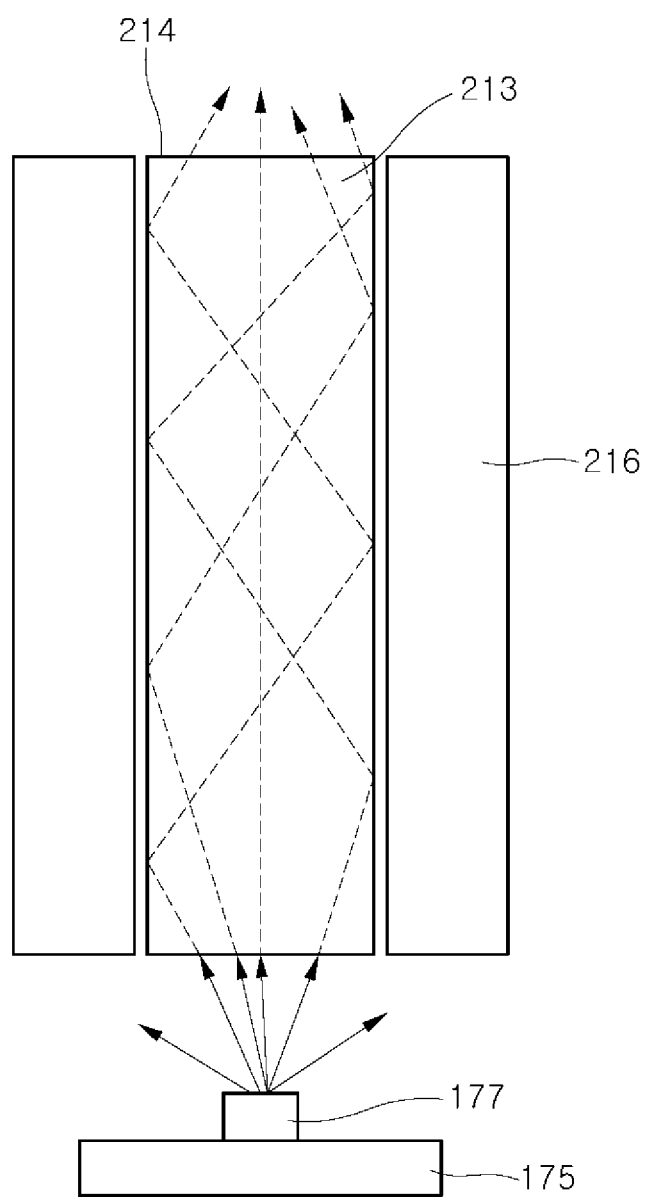

In some implementations, referring to FIG. 13, for convenience of illustration, a shape of the light guide is represented by a rectangle rather than a trapezoid.

Figure 9:
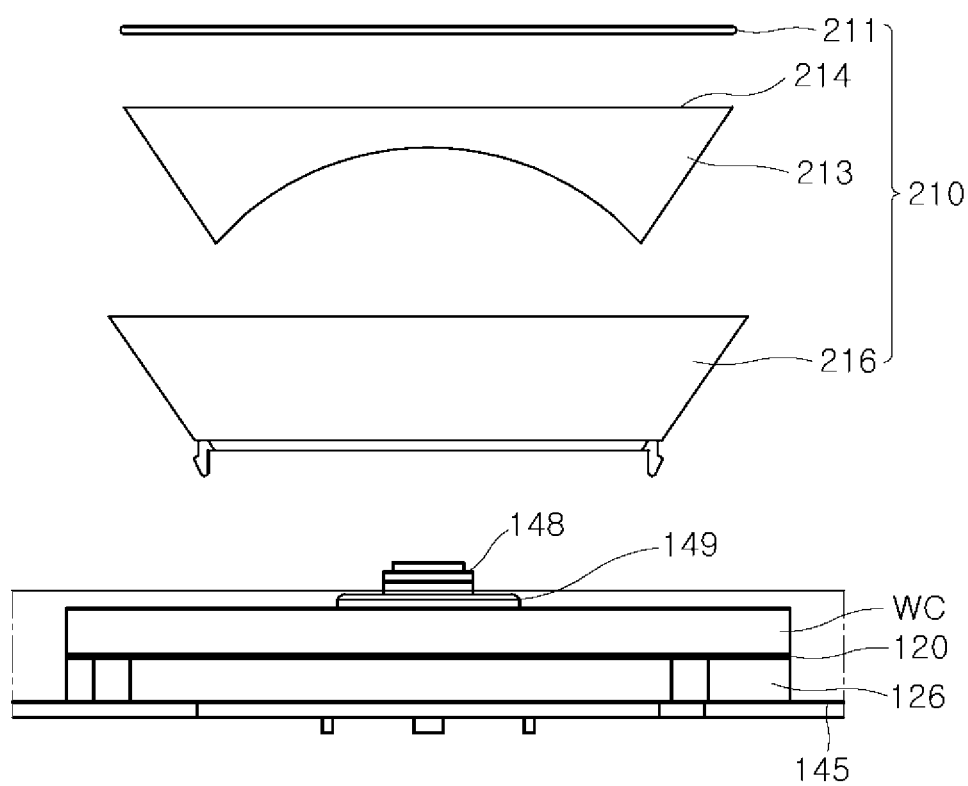
FIG. 9 to FIG. 13 are schematic diagrams for illustrating an example light guide of FIG. 8.

First, referring to FIG. 9, the light guide 210 may include a diffusion film 211, a light-guide portion 213, and a light-guide support 216.

For example, the diffusion film 211 may be disposed on a top face of the light-guide portion 213.

That is, the diffusion film 211 is disposed on a top face of the light-guide portion 213. The diffusion film may diffuse, to the outside, light as emitted from the light emitting element 177 and transmitted to the light-emission face 214 of the light-guide portion 213.

The light-guide portion 213 may receive the light emitted from the light emitting element 177 and emit the light through the light-emission top face 214.

Figure 10:
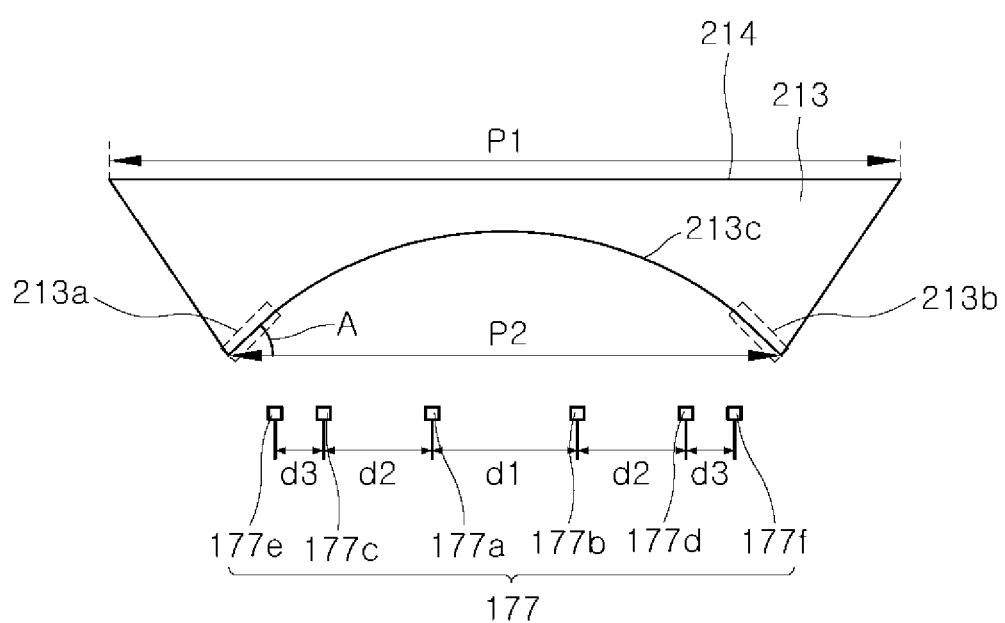
Figure 11:
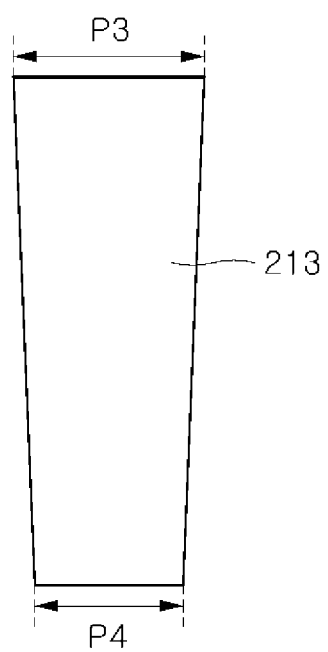

In this connection, referring to FIG. 10 and FIG. 11, a length P1 in a first direction of the top face of the light-guide portion 213 may be larger than a length P2 in the first direction of a bottom face of the light-guide portion 213. The bottom face thereof may be formed in a parabolic shape. The top face may include the light-emission face 214.

For example, the bottom face of the light-guide portion 213 may include a first straight-line shaped face 213a having one end connected to one end of the bottom face, a curved face 213b having one end connected to the other end of the first straight-line shaped face 213a and extending in a parabolic shape, and a second straight-line shaped face 213c connected to and disposed between the other end of the curved face 213b and the other end of the bottom face. In some implementations, the first straight-line shaped face 213a may be referred to as a first linear section, the second straight-line shaped face 213c may be referred to as a second linear section, and the curved face 213b may be referred to as a curved section.

In this connection, the lengths of the first and second straight-line shaped faces 213a and 213c may be equal to each other, while the length of each of the first and second straight-line shaped faces 213a and 213c may be smaller than a length of the curved face 213b. The present disclosure is not limited thereto.

In some implementations, the bottom face of the light-guide portion 213 may not include the straight-line shaped face but may include only the curved face. However, for convenience of illustration, in one implementation of the present disclosure, an example where the bottom face of the light-guide portion 213 includes the first and second straight-line shaped faces 213a and 213c and the curved face 213b is illustrated below.

In some implementations, an angle A defined between the straight-line shaped face (e.g., the first straight-line shaped face 213a) of the light-guide portion 213 and the bottom face (e.g., the bottom face of the light-guide support 216) may be in a range of, for example, 30° to 50°. The present disclosure is not limited thereto.

In this manner, when the bottom face of the light-guide portion 213 is configured in a parabolic shape, the light emitted from the light emitting element 177 may be refracted and diffused from the bottom face of the light-guide portion 213. Thus, the light emitted from the light emitting element 177 may be uniformly transmitted to both lateral ends of the light-emission face 214 of the light-guide portion 213.

In some implementations, a length of each of the straight-line shaped faces 213a and 213c and the curved face 213b, the angles A, and a length ratio between the straight-line shaped faces 213a and 213c and the curved face 213b may vary depending on a size of the light guide 210, a target surface illumination, a target uniformity, and the like.

A length P3 in a second direction of the top face of the light-guide portion 213 may be larger than a length P4 in the second direction of the bottom face of the light-guide portion 213. The second direction may be orthogonal to the first direction.

That is, the lengths P1 and P3 of the top face of the light-guide portion 213 in the first and second directions may be larger than the lengths P2 and P4 of the bottom face of the light-guide portion 213 in the first and second directions, respectively. Thus, the light-emission face 214 that is wider than a width of the light emitting element 177 may be realized.

Therefore, even when a space of the light guide receiving hole 147 is insufficient due to the presence of the connection hole 172 or the ferrite core 126, the light-emission face 214 may be adapted to the size of the working coil WC. In some implementations, although the number of light emitting elements 177 is small, an area of the light-emission face 214 may be increased. As a result, the quantity of emitted light is increased.

In some implementations, a plurality of light emitting elements 177a, 177b, 177c, 177d, 177e, and 177f may be disposed. The plurality of light emitting elements 177a, 177b, 177c, 177d, 177e, and 177f may be arranged symmetrically with respect to a center of the bottom face of the light-guide portion 213.

For example, the plurality of light emitting elements 177 may include: first and second light emitting elements 177a and 177b spaced by a first spacing in a left-right direction and symmetrically with respect to the center of the bottom face of the light-guide portion 213; third and fourth light emitting elements 177c and 177d spaced apart from each other by a second spacing larger than the first spacing in the left-right direction and symmetrically with respect to the center of the bottom face of the light-guide portion 213; and fifth and sixth light emitting elements 177e and 177f symmetrically spaced apart from each other by a third spacing larger than the second spacing in the left-right direction and symmetrically with respect to the center of the bottom face of the light-guide portion 213.

That is, a spacing d1 between the first and second light emitting elements 177a and 177b may be larger than a spacing d2 between the first and the third light emitting elements 177a and 177c. The spacing d2 between the first and third light emitting elements 177a and 177c may be greater than a spacing d3 between the third and fifth light emitting elements 177c and 177e. Similarly, the spacing d1 between the first and second light emitting elements 177a and 177b may be larger than the spacing d2 between the second and the fourth light emitting elements 177b and 177d. The spacing d2 between the second and fourth light emitting elements 177b and 177d may be greater than the spacing d3 between the fourth and sixth light emitting elements 177d and 177f.

In this way, the plurality of light emitting elements 177 are not arranged in an equidistant manner. Rather, the plurality of light emitting elements 177 may be arranged such that the spacing between the light emitting elements located in the middle region as arranged symmetrically with reference to the center of the bottom face of the light-guide portion 213 is larger than the spacing between the light emitting elements located at each of both ends.

In some examples, using the arrangement described above may remove the problem that a surface illumination at each of both lateral ends of the light-emission face 214 is lower than a surface illumination at a central region of the light-emission face 214, which may lead to a non-uniform illumination distribution.

In some implementations, the distances between the plurality of light emitting elements 177a, 177b, 177c, 177d, 177e, and 177f may vary to be adapted to a shape of the light-guide portion 213, and a target uniformity. In some examples, the surface illumination and light uniformity of the light-emission face 214 may vary depending on the color of the light-guide support 216. Thus, the distances between the plurality of light emitting elements 177a, 177b, 177c, 177d, 177e, and 177f may be adapted based on the color of the light-guide support 216.

Although FIG. 10 illustrates the number of the plurality of light emitting elements 177 as six, for example, the present disclosure is not limited thereto. That is, for convenience of illustration, one example where the number of the plurality of light emitting elements 177 is six is exemplified.

Figure 12:
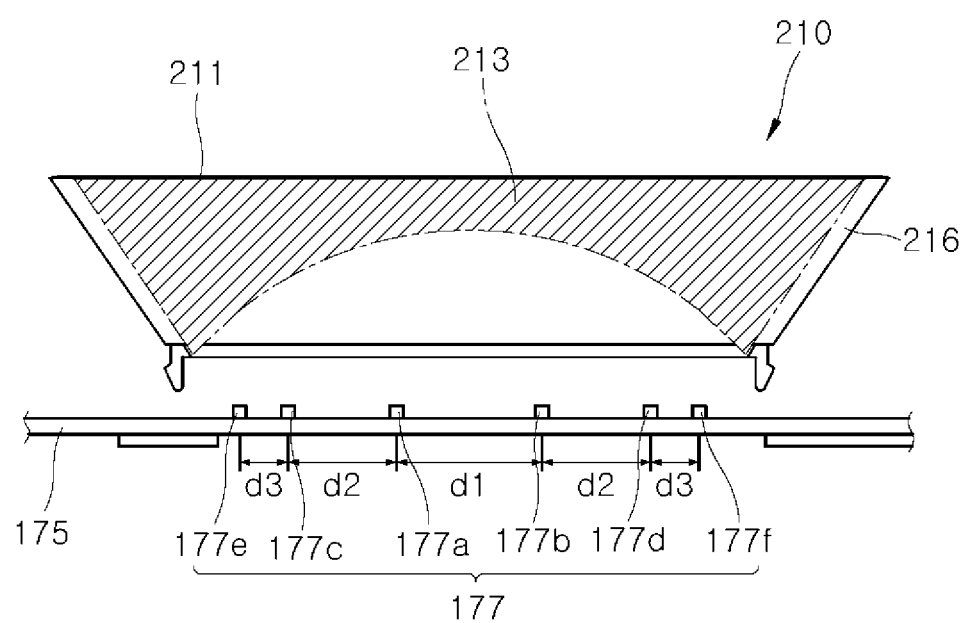

Referring now to FIG. 12 and FIG. 13, the light-guide support 216 may be disposed on the base plate 145 (see FIG. 9) to surround the light-guide portion 213. The light-guide support 216 may totally and inwardly reflect light as emitted from the light emitting element 177 and developed through the light-guide portion 213.

For example, the light-guide support 216 may be configured to surround the light-guide portion 213. Thus, in a similar manner to the light-guide portion 213, lengths of the top face of the light-guide support 216 in the first and second directions may be larger than lengths of the bottom face of the light-guide support 216 in the first and second directions, respectively.

In some implementations, an inner side face of the light-guide support 216 may be made of a material capable of totally reflecting light. Thus, the light as emitted from the light emitting element 177 and refracted and diffused from the bottom face of the light-guide portion 213 may be totally reflected inwardly from the light-guide support 216.

As illustrated in FIG. 13, light-beams totally-reflected obliquely upwards from the inner side face of the light-guide support 216 in a zigzag manner may be transmitted through the light-emission face 214 of the light-guide portion 213. This allows the light emitted from the light emitting element 177 to be more uniformly emitted through the light-emission face 214 of the light-guide portion 213.

In some cases, the light emitted from the plurality of light emitting elements may not be transmitted to both lateral ends of the light-emission face of the light-guide portion. This may lead to darkness at the both lateral ends of the light-emitting face. That is, this may lead to the reduction of the illumination uniformity of the light-emission face, which may disallow the user to accurately determine whether the working coil is driven and the output intensity thereof.

To the contrary, the induction heating device 1 includes the light guide 210 and light emitting element 177 having the above-described configurations. Thus, light-beams as emitted from the plurality of light emitting elements 177 may be transmitted to both lateral ends of the light-emission face 214 of the light-guide portion 213. Further, this may compensate for loss of the light beams from the light emitting element 177 which may be caused by the air-flow path AP defined between the base plate 145 and the indicator board 175. In this way, the light uniformity of the light-emission face 214 can be further improved.

As described above, the induction heating device 1 may reliably realize the temperature control of the working coil WC and the indicator (i.e., the light guide 210 and the light emitting element 177). This may remedy the heat generation problem as in the prior art. Furthermore, even when four indicators are arranged at four sides surrounding the working coil WC with a high output respectively, the heat generation problem from the working coil and the indicator may be removed since the temperature control of the working coil WC and indicator may be realized. Further, output performance of the working coil WC, and light-emission performance of the indicator may be maintained.

In some implementations, the induction heating device 1 may minimize damage to the indicator due to the heat generated from the working coil, thereby improving a device life and securing device reliability.

In some implementations, in the induction heating device 1, the types and number of components associated with the indicator may be reduced. This makes it possible to reduce material cost and manufacturing time. Further, labor cost and production cost can be reduced by reducing the manufacturing time.

In some implementations, in the induction heating device 1, the area of the light-emission face 214 may be enlarged to be adapted to a size of the working coil WC for a compact structure. This not only improves space utilization, but also does not require additional components to increase the area of the light-emission face 214.

In some implementations, the induction heating device 1 may improve light uniformity from the light-emission face 214. Thus, the user may more accurately check whether the working coil WC is driven and the output intensity of the coil. This realizes improvement of the efficiency of the cooking operation by the user.

In the above description, numerous specific details are set forth in order to provide a thorough understanding of the present disclosure. The present disclosure may be practiced without some or all of these specific details. Examples of various implementations have been illustrated and described above. It will be understood that the description herein is not intended to limit the claims to the specific implementations described. On the contrary, it is intended to cover alternatives, modifications, and equivalents as may be included within the spirit and scope of the present disclosure as defined by the appended claims.

What is claimed is:

1. An induction heating device comprising:
a casing;
a cover plate coupled to a top of the casing and configured to seat an object on a top surface of the cover plate;
a working coil located within the casing and configured to heat the object on the top surface of the cover plate;
a base plate configured to support the working coil;
a light guide that is located at the base plate and that surrounds at least a portion of the working coil;
an indicator board that is located vertically below the base plate and that is spaced apart from the base plate to define an air-flow path between the base plate and the indicator board, the indicator board comprising a plurality of light emitting elements that are located vertically below the light guide and that are configured to emit light toward the light guide;
a blowing fan located at a first side of a bottom surface of the casing and configured to suction air into the casing from an outside of the casing and to discharge air into the air-flow path; and
an indicator board support configured to seat the indicator board,
wherein the air-flow path is defined by a bottom surface of the base plate, a top surface of the indicator board, and a lateral surface of the indicator board support, and
wherein the light guide includes:
a light-guide portion that has an upper surface having a light-emission face configured to transmit the light emitted from the plurality of light emitting elements and a lower surface having a parabolic shape, and
a light-guide support that is located at the base plate, that surrounds at least a portion of the light-guide portion, and that is configured to reflect light emitted from the plurality of light emitting elements inwardly to the light-guide portion, the light-guide support allowing propagation of light through the light-guide portion toward the light-emission face.

2. The induction heating device of claim 1, wherein the casing defines an air-discharge slit at a second side of the bottom surface of the casing opposite to the first side, the air-discharge slit being configured to discharge air from the air-flow path to the outside of the casing.

3. The induction heating device of claim 2, wherein the base plate and the indicator board are located at a middle region of the casing between the first side and the second side,
wherein the blowing fan is located outside of the middle region at the first side of the bottom surface of the casing, and
wherein the air-discharge slit is defined outside of the middle region at the second side of the bottom surface of the casing.

4. The induction heating device of claim 1, wherein the base plate is a single plate made of aluminum (Al).

5. The induction heating device of claim 1, wherein the blowing fan is configured to, based on discharging air to the air-flow path, decrease a temperature of the working coil and a temperature of the plurality of light emitting elements.

6. The induction heating device of claim 1, further comprising:
a ferrite core located at the base plate vertically below the working coil, the ferrite core being configured to diffuse a magnetic field generated by the working coil; and
a mica sheet located between the working coil and the ferrite core and configured to reduce heat transfer from the working coil to the ferrite core.

7. The induction heating device of claim 6, wherein the mica sheet is configured to couple to the working coil and to the ferrite core by a sealant.

8. The induction heating device of claim 1,
wherein
the upper surface of the light-guide portion extends in a first direction by a first length, and
wherein the lower surface of the light-guide portion extends in the first direction by a second length that is less than the first length.

9. The induction heating device of claim 8, wherein the lower surface of the light-guide portion includes:
a first linear section that extends linearly from a first lateral end of the lower surface of the light-guide portion;
a curved section that extends in the parabolic shape from the first linear section; and
a second linear section that extends linearly from the curved section to a second lateral end of the lower surface of the light-guide portion, the second lateral end being opposite to the first lateral end.

10. The induction heating device of claim 8, wherein the upper surface of the light-guide portion extends in a second direction by a third length, the second direction being orthogonal to the first direction, and wherein the lower surface of the light-guide portion extends in the second direction by a fourth length that is less than the third length.

11. The induction heating device of claim 8, wherein the lower surface of the light-guide portion is configured to refract and diffuse light emitted from the plurality of light emitting elements, and wherein the light-emission face is configured to emit at least one of light reflected from the light-guide support inwardly toward the light-guide portion or light transmitted through the light-guide portion without reflection at the light-guide support.

12. The induction heating device of claim 8, wherein the plurality of light emitting elements are arranged at symmetric positions with respect to a center of the lower surface of the light-guide portion to allow a uniform distribution of light on the light-emission face.

13. The induction heating device of claim 8, wherein the plurality of light emitting elements comprise:

first and second light-emitting elements that are spaced apart from each other by a first distance and that are located at symmetric positions with respect to a center of the lower surface of the light-guide portion;

third and fourth light-emitting elements that are spaced apart from each other by a second distance greater than the first distance and that are located at symmetric positions with respect to the center of the lower surface of the light-guide portion; and fifth and sixth light-emitting elements that are spaced apart from each other by a third distance greater than the second distance and that are located at symmetric positions with respect to the center of the lower surface of the light-guide portion.

14. The induction heating device of claim 13, wherein the first distance between the first and second light-emitting elements is greater than a distance between the first and third light-emitting elements, and wherein the distance between the first and third light-emitting elements is greater than a distance between the third and fifth light-emitting elements.

15. The induction heating device of claim 8, wherein the light guide further comprises a diffusion film located on the upper surface of the light-guide portion.

16. The induction heating device of claim 8, wherein a cross-sectional shape of the light-guide support is a trapezoidal shape.

17. The induction heating device of claim 8, wherein the light guide comprises a plurality of light guides that each surround at least a portion of the working coil, each light guide being inclined with respect to the base plate.

18. The induction heating device of claim 1, wherein the plurality of light emitting elements are arranged at a surface of the indicator board that faces the air-flow path.

19. The induction heating device of claim 1, wherein the air-flow path is located vertically above the blowing fan, and wherein the blowing fan is configured to generate flow of air in an upward direction to the air-flow path from the bottom surface of the casing.

20. The induction heating device of claim 1, wherein the lateral surface of the indicator board support extends between the top surface of the indicator board and the bottom surface of the base plate.

* * * * *